July 10, 1928.  1,677,097
F. S. CARR
FASTENER
Filed Aug. 25, 1925
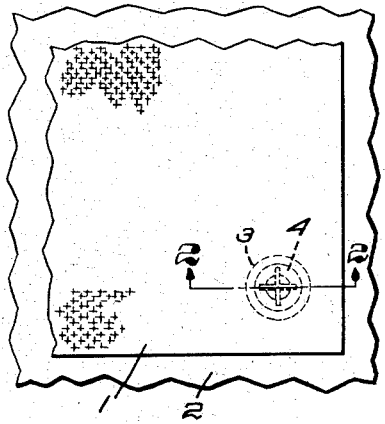
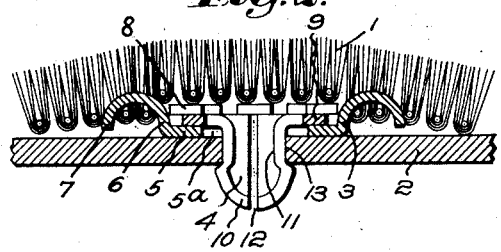
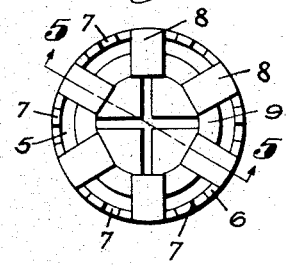
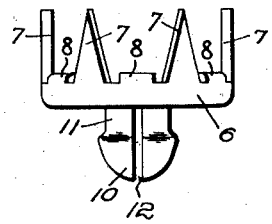
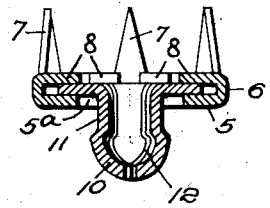
Inventor:
Fred S. Carr,
by Emery Booth Janney & Varney
Attys.

Patented July 10, 1928.

1,677,097

UNITED STATES PATENT OFFICE.

FRED S. CARR, OF NEWTON, MASSACHUSETTS, ASSIGNOR TO CARR FASTENER COMPANY, OF CAMBRIDGE, MASSACHUSETTS, A CORPORATION OF MAINE.

FASTENER.

Application filed August 25, 1925. Serial No. 52,316.

This invention aims to provide an improved carpet fastener installation.

In the drawings which illustrate a preferred embodiment of my invention:—

Fig. 1 is a plan view of a portion of a carpet or rug, a portion of the underlying floor and the fastening means (in dotted lines) for securing the carpet to the floor;

Fig. 2 is an enlarged section on the line 2—2 of Fig. 1;

Fig. 3 is a plan view of the stud unit before attachment to a carpet;

Fig. 4 is a side elevation of the stud unit; and

Fig. 5 is a section through the stud unit on the line 5—5 of Fig. 3.

Referring to the drawings, I have shown a carpet fastener installation which includes fastening means of very simple and inexpensive construction.

Heretofore carpet fasteners usually included a socket member and a stud member which had to be somewhat carefully aligned with each other so as to be readily secured together without stretching the carpet to any great extent. Such fasteners if not closely aligned required too great a stretch of the carpet to permit fastening with the result that one or the other had to be removed and repositioned to provide for better alignment.

The stud member of the fastening means illustrated in the drawings is shiftable to a limited extent in any transverse direction relative to the carpet and therefore the combined shiftability of any number of fasteners located in a given line of strain on the carpet will permit alignment of the fastener elements where they could not be secured together without the shiftable feature of the stud. The shiftable members of the fastener may be secured to the floor but I prefer that they shall be secured to the carpet so that a plain hole in the floor may suffice as a socket element.

The installation as illustrated in Figs. 1 and 2 includes a carpet 1, carrying a plurality of shiftable stud units (only one of which is shown) and a floor 2 (which may be the floor boards, sills or other portions of an automobile underlying the carpet).

The stud unit includes a casing part 3 and a stud part 4 each formed from a single piece of metal and secured in assembled relation with each other as illustrated in Figs. 3, 4 and 5. The casing has a flat face portion 5 presenting an aperture 5ª through which a portion of the stud may protrude, an annular wall 6, a plurality of attaching prongs 7 extending upwardly from the wall and a plurality of ears 8 extending inwardly from the wall generally parallel with and spaced away from the face portion 5. The stud part includes a flat base portion 9 from which is pressed a head 10 and a relatively long neck 11. The head and neck are made contractible and expansible by slits 12 which extend from the top of the head to the base 9 as illustrated in Fig. 2.

When the parts of the stud unit are assembled the ears 8 of the casing overlie the base 9 of the stud to prevent axial movement of the stud part relative to the casing and the head and neck extend through the aperture 5ª as illustrated in Fig. 5. Transverse shifting movement of the stud in any direction relative to the socket is permitted because the base 9 of the stud is smaller in diameter than the space enclosed by the wall 6 of the casing and because the neck 11 of the stud is smaller in diameter than the diameter of the aperture 5ª in the face portion 5 of the casing which the head and neck of the stup pass.

The stud member may be secured to the carpet 1 in any suitable manner but I prefer to secure it to the under side thereof by forcing the prongs 7 through the web of the carpet and bending them outwardly and downwardly from the wall 6 to hook over the warp and weft threads of the carpet as illustrated in Fig. 2.

The floor 2 may be of wood or of metal as shown in the drawings and the only socket necessary is a plain hole or aperture 13 through the floor about the diameter of the neck of the stud as shown in Fig. 2.

When securing the carpet 1 to the floor 2 the stud member may be shifted so as to align with the aperture 13, then by exerting pressure upon the carpet directly over the stud, the head 10 may be forced to contract and snap through the aperture. Separation of the fastener may be easily and quickly effected by lifting the carpet adjacent to a stud unit.

While I have shown and described a preferred embodiment of my invention it will be understood that changes involving omission, substitution, alternation and reversal of parts and even changes in the mode of operation may be made without departing from the scope of my invention which is best defined in the following claims.

Claims:

1. A carpet fastener installation comprising, in combination, a carpet, a casing secured to said carpet and a stud member assembled with and projecting from said casing, said stud shiftable in any transverse direction relative to said casing for alignment with a cooperating socket.

2. A carpet fastener installation comprising, in combination, a carpet, a casing secured to the under side of said carpet, a resilient stud member assembled with and shiftable in any transverse direction relative to said casing, and a floor presenting a stud receiving aperture of fixed dimensions for receiving said resilient stud member thereby to secure the carpet in place upon the floor.

3. A carpet fastener installation comprising, in combination, a carpet, a casing member and a stud member, said casing member presenting a plurality of attaching prongs hooked over the warp and weft threads of said carpet to secure said casing to the under side of the carpet and means for holding said stud in assembly with said casing while permitting substantial transverse shifting movement of said stud relative to the casing for alignment with a cooperating fixed socket.

4. A carpet fastener installation comprising, in combination, a carpet, a casing, and a contractible and expansible stud assembled with said casing and shiftable transversely relative thereto, said casing presenting a plurality of outwardly curved attaching prongs hooked over the warp and weft threads of the carpet to secure said casing and said stud to the underside thereof.

5. A carpet fastener installation including separable fastening means comprising stud and socket elements one of which is shiftable relative to the other for alignment therewith and carrying mediums adapted to be secured together by the fastener elements, one of said fastener elements including a part for attachment to one of the carrying mediums and a second part for cooperation with the other fastener element, said second part having a portion held by said attaching part and said portion being of smaller diameter than said attaching part so as to be shiftable transversely in all directions in the first-mentioned part, thereby to provide for the alignment of the stud and socket elements.

6. A carpet fastener installation including a carpet and a stud unit attached to the carpet for engagement with cooperating fastener means to position the carpet relative to a part which presents said cooperating fastener means, said stud unit including a casing part presenting attaching means extending therefrom to secure the casing to the fastener support and a stud part having a base assembled with said casing part and a head and neck extending therefrom in the opposite direction from said attaching means, said base being of smaller diameter than said casing and being transversly shiftable in any direction in said casing.

7. A stud unit including a one-piece casing part having attaching prongs extending outwardly therefrom for securing it to a suitable support and a stud member assembled with the casing, said stud member having a base held by said casing, said base being smaller in diameter than said casing so as to be shiftable transversely in any direction in said casing and presenting a resilient head which extends from the casing at the opposite side thereof from which the attaching prongs extend.

8. A carpet fastener installation including a carpet, a stud part located at the under side of the carpet and an attaching part assembled with the stud to provide a single unit for securing said stud to the carpet, said stud part having a base held by said attaching part and having its periphery spaced from the attaching part, said base being shiftable transversely in all directions relative to said attaching part.

In testimony whereof, I have signed my name to this specification.

FRED S. CARR.